United States Patent
Huang

(10) Patent No.: US 12,444,064 B2
(45) Date of Patent: Oct. 14, 2025

(54) QUANTITATIVE LINEAR INDEPENDENT VECTOR BASED METHOD (QLIVBM) FOR IMAGE ALIGNMENT

(71) Applicant: KLA Corporation, Milpitas, CA (US)

(72) Inventor: Qilong Huang, Portland, OR (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/801,185

(22) Filed: Aug. 12, 2024

(65) Prior Publication Data

US 2025/0069242 A1 Feb. 27, 2025

Related U.S. Application Data

(60) Provisional application No. 63/534,351, filed on Aug. 24, 2023.

(51) Int. Cl.
*G06T 7/33* (2017.01)
*G06T 7/00* (2017.01)

(52) U.S. Cl.
CPC ............. *G06T 7/337* (2017.01); *G06T 7/001* (2013.01); *G06T 2207/30148* (2013.01)

(58) Field of Classification Search
CPC .............. G06T 7/337; G06T 7/001; G06T 2207/30148; G06T 2207/10061; G06T 7/33
See application file for complete search history.

(56) References Cited

U.S. PATENT DOCUMENTS

| | | | |
|---|---|---|---|
| 6,640,000 B1 | 10/2003 | Fey et al. | |
| 7,486,842 B2 | 2/2009 | Gasparri et al. | |
| 8,126,255 B2 | 2/2012 | Bhaskar et al. | |
| 8,664,594 B1 | 3/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 8,750,597 B2 * | 6/2014 | Patterson | G06T 7/001 382/151 |
| 9,222,895 B2 | 12/2015 | Duffy et al. | |

(Continued)

FOREIGN PATENT DOCUMENTS

KR 10-2000-0036155 6/2000

OTHER PUBLICATIONS

International Search Report and Written Opinion for PCT/US2024/043512 mailed Dec. 11, 2024.

*Primary Examiner* — Samir A Ahmed
(74) *Attorney, Agent, or Firm* — Entropy Matters LLC

(57) ABSTRACT

Methods and systems for image alignment are provided. One method includes separately aligning candidate alignment target images in images generated for a specimen to corresponding setup images for setup alignment targets selected to have mutually linearly independent vectors between locations of the setup alignment targets and a reference location. The method also includes, for any of the candidate images successfully aligned to its corresponding setup image, separately determining coordinates of the reference location from coordinates of the aligned candidate images and their corresponding mutually linearly independent vectors. In addition, the method includes determining final coordinates of the reference location in the images generated for the specimen from the separately determined coordinates of the reference location.

20 Claims, 7 Drawing Sheets

(56) References Cited

U.S. PATENT DOCUMENTS

| | | | |
|---|---|---|---|
| 2008/0095407 A1* | 4/2008 | Stewart | G06T 7/33 382/284 |
| 2013/0129189 A1 | 5/2013 | Wu et al. | |
| 2016/0188784 A1* | 6/2016 | Bhattacharyya | G03F 7/70616 716/111 |
| 2016/0275672 A1 | 9/2016 | Bhattacharyya et al. | |
| 2021/0097704 A1* | 4/2021 | Brauer | G03F 7/7065 |
| 2021/0242059 A1* | 8/2021 | Chen | G06T 7/001 |
| 2021/0383557 A1* | 12/2021 | Brauer | G06T 7/001 |
| 2022/0375051 A1 | 11/2022 | Brauer et al. | |

* cited by examiner

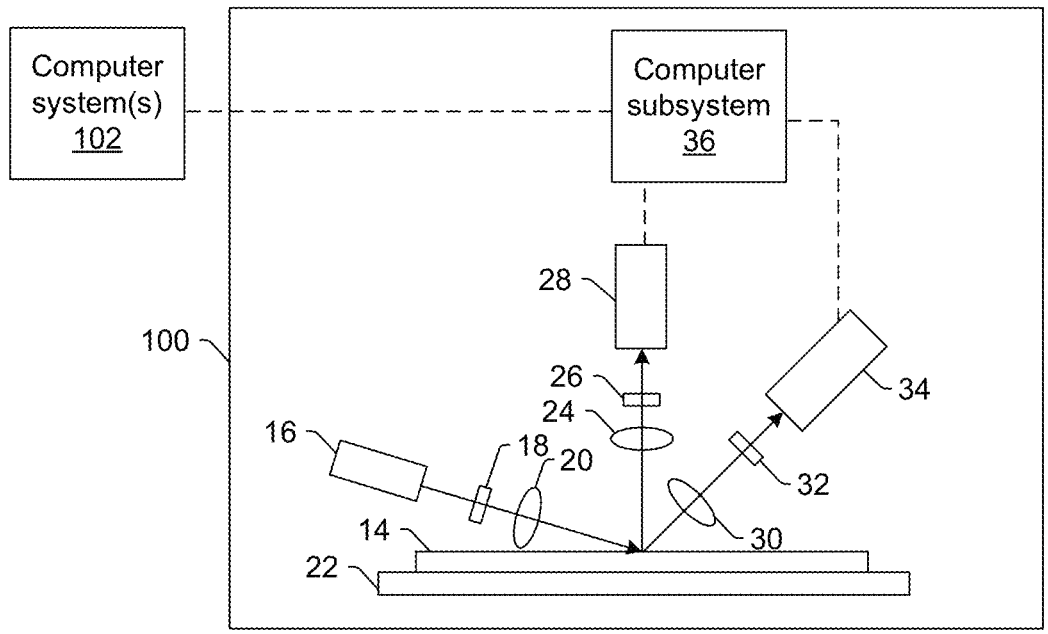
Fig. 1
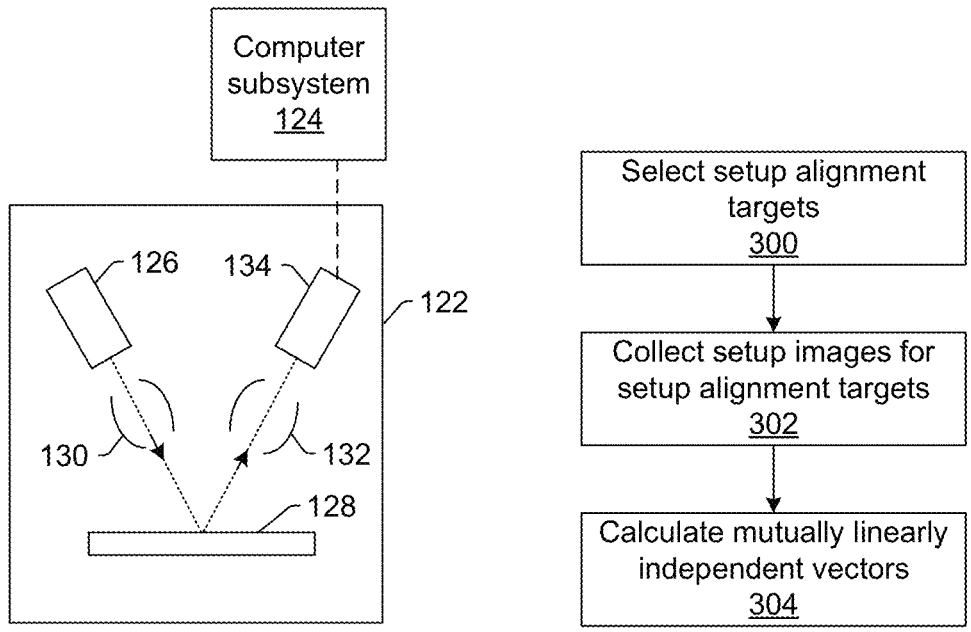
Fig. 2
Fig. 3

| Candidate # | Candidate kernels | Coordinates of candidate's kernel center (setup) | Vector from kernel center to die corner |
|---|---|---|---|
| 1 |  | (Xs1, Ys1) | $\vec{v_1}$ |
| 2 |  | (Xs2, Ys2) | $\vec{v_2}$ |
| 3 |  | (Xs3, Ys3) | $\vec{v_3}$ |
| 4 |  | ... | ... |
| 5 |  | ... | ... |
| 6 |  | ... | ... |
| 7 |  | ... | ... |
| N |  | (XsN, YsN) | $\vec{v_N}$ |

| Candidate # | Candidate kernels | Coordinates of candidate's kernel center (runtime) | Vector from kernel center to die corner |
|---|---|---|---|
| 1 |  | (Xr1, Yr1) | $\vec{v_1}$ |
| 2 |  | (Xr2, Yr2) | $\vec{v_2}$ |
| 3 |  | (Xr3, Yr3) | $\vec{v_3}$ |
| 4 |  | ... | ... |
| 5 |  | ... | ... |
| 6 |  | ... | ... |
| 7 |  | ... | ... |
| N |  | (XrN, YrN) | $\vec{v_N}$ |

QUANTITATIVE LINEAR INDEPENDENT VECTOR BASED METHOD (QLIVBM) FOR IMAGE ALIGNMENT

BACKGROUND OF THE INVENTION

1. Field of the Invention

The present invention generally relates to methods and systems for image alignment to a reference location for specimens such as wafers and reticles. Certain embodiments described herein are related to quantitative linear independent vector based methods (QLIVBM) for image alignment that is particularly suitable for non-optimal sites and false alignment avoidance.

2. Description of the Related Art

The following description and examples are not admitted to be prior art by virtue of their inclusion in this section.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

One important step that can cause an inspection to fail if not performed correctly and accurately is aligning test and reference images to each other. For example, many inspection processes subtract a reference image from a test image and then apply some defect detection method to the resulting image, often referred to as a difference image. If the images are not properly aligned to each other prior to the subtraction, then many differences between the images caused by poor alignment can be erroneously detected as defects.

Much research and development in inspection processes has therefore been directed towards developing accurate and efficient methods for aligning test and reference images to each other. One widely used, existing method involves selecting a single alignment site for wafer alignment in the setup phase. The setup phase also includes recording the alignment site kernel image in the recipe for the inspection process.

During runtime, such methods include aligning the single alignment site kernel and runtime alignment site images flowing through one of one or more alignment algorithms. The method may also include determining if the kernel image matched to the runtime alignment site image. If the kernel and runtime alignment site images do not match, the method may include determining if all alignment algorithms have been tried. If not, then alignment may be performed for the same images with another alignment algorithm. If the kernel and runtime images still do not match and the method determines that all alignment algorithms have been tried, the method may abort the alignment attempts. If the kernel and runtime images do match, then the method may determine that alignment has been achieved.

There are, however, a number of disadvantages to many of the currently used methods for image alignment. For example, in the method described above, false alignment and low die corner accuracy determination are possible. Some attempts to prevent that include trying to make the inline runtime wafer's alignment site look more like the alignment site saved in kernel during setup. Algorithm development can also involve trying to make the algorithm less sensitive (where the algorithm does more) or more sensitive (so the algorithm does less). For example, an algorithm that "does more" may do more image processing, such as emphasizing certain patterns, increasing the contrast, filtering out certain frequencies, extracting certain patterns, etc. to make runtime alignment site images look more similar to the setup alignment site image thereby making the tool less sensitive to differences between runtime and setup images and increasing the chance of achieving alignment. However, a less sensitive algorithm can lead to false alignment and premap and pixel-to-design alignment (PDA) interruption. In one such example, all of the image processing described above that is designed to make the algorithm less sensitive to alignment site image variations can actually change the runtime alignment site image so much that it aligns to the wrong setup alignment site image thereby causing false alignment and premap and PDA interruption. In the same way, a more sensitive algorithm can cause failed alignment interruption due to variations between the runtime and setup alignment target images that are not corrected by the algorithm. There is therefore a dilemma for current algorithm development on false alignment and failed alignment.

To summarize then, if alignment algorithms are less sensitive, the alignment site tends to match to the wrong location, which causes false alignment and subsequent premap and PDA interruption. However, if the alignment algorithms are too sensitive, then the alignment can fail frequently due to process change, which causes instant alignment interruption. There is also no current solution for aligning runtime wafers with missing or damaged alignment sites.

Accordingly, it would be advantageous to develop systems and methods for aligning images of a specimen to a reference location in the images that do not have one or more of the disadvantages described above.

SUMMARY OF THE INVENTION

The following description of various embodiments is not to be construed in any way as limiting the subject matter of the appended claims.

One embodiment relates to a system configured for image alignment. The system includes an imaging subsystem configured to generate images of a specimen. The system also includes a computer subsystem configured for separately aligning candidate alignment target images in the images generated for the specimen to corresponding setup images for setup alignment targets selected to have mutually linearly independent vectors between locations of the setup alignment targets and a reference location. For each of one or more of the candidate alignment target images successfully aligned to its one of the corresponding setup images, the computer subsystem is configured for separately determining coordinates of the reference location in the images generated for the specimen from coordinates for each of the one or more of the candidate alignment target images and its corresponding one of the mutually linearly independent vectors. In addition, the computer subsystem is configured for determining final coordinates of the reference location in the images generated for the specimen from the separately determined coordinates of the reference location. The system may be further configured as described herein.

Another embodiment relates to a computer-implemented method for image alignment. The method includes the separately aligning, separately determining coordinates, and determining final coordinates steps described above, which are performed by a computer subsystem. Each of the steps of the method may be performed as described further herein. The method may include any other step(s) of any other method(s) described herein. The method may be performed by any of the systems described herein.

Another embodiment relates to a non-transitory computer-readable medium storing program instructions executable on a computer system for performing a computer-implemented method for image alignment. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which:

FIGS. 1 and 2 are schematic diagrams illustrating side views of embodiments of a system configured as described herein;

FIG. 3 is a flow chart illustrating an embodiment of steps that may be performed for a setup phase of image alignment;

Figure 4:
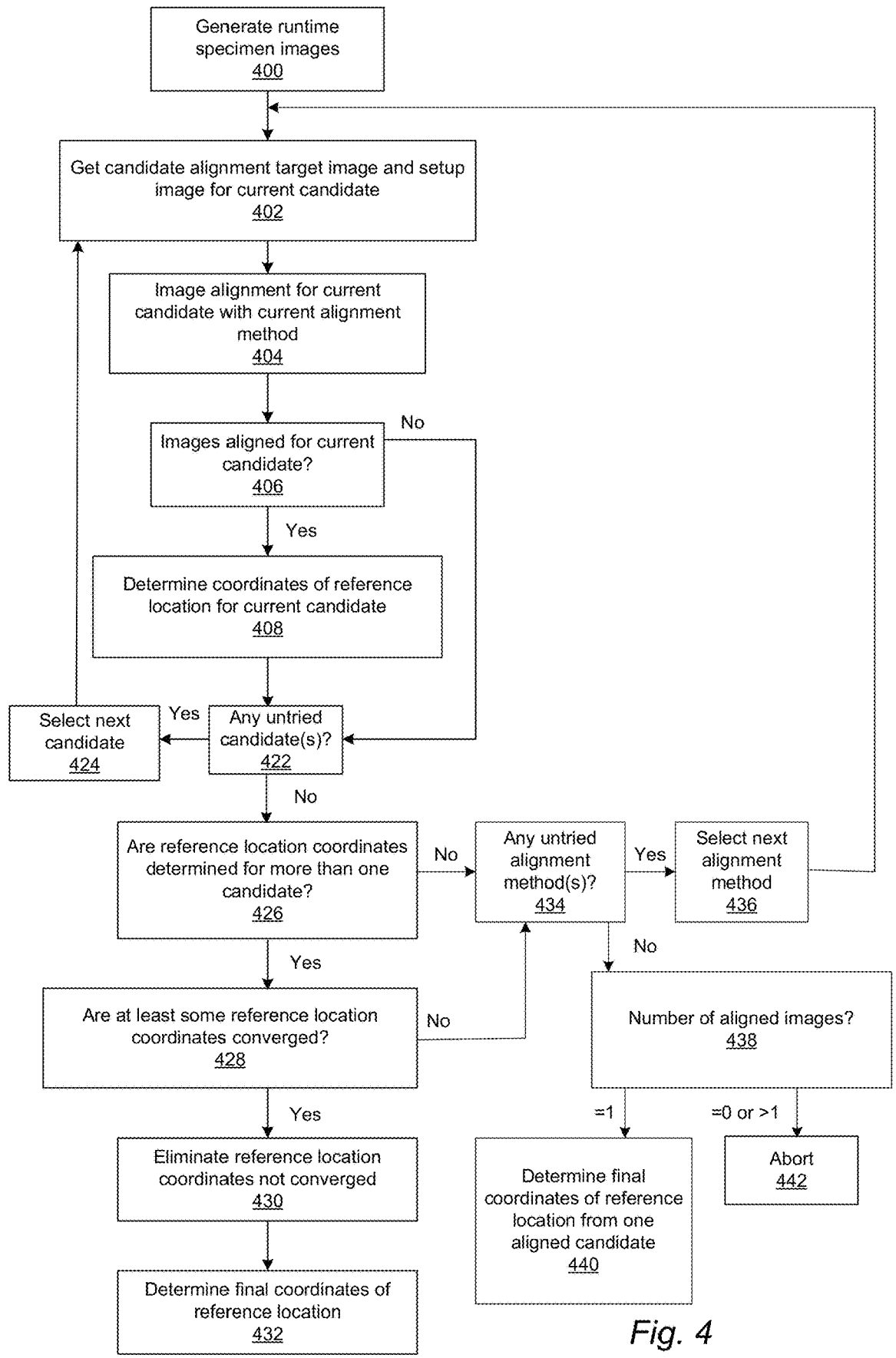
FIG. 4 is a flow chart illustrating an embodiment of steps that may be performed for a runtime phase of image alignment.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for image alignment. Certain embodiments relate to quantitative linear independent vector based methods (QLIVBM) that are particularly useful for non-optimal sites alignment solutions and false alignment avoidance.

The measurement of mean number of wafers ran between interruptions (MWBI) value is to evaluate the reliability and usability of inspection platforms during runtime, which can have significant financial implications. Alignment failure is the major root cause for most interruptions, and it can severely impact the MWBI value. As a consequence, the adoption of inspection platforms to high volume research and development fab utilization, as well as worldwide high-volume manufacturing applications, becomes less likely as the probability of alignment failure increases.

In currently used methods on current wafer inspection tools, if alignment algorithms are less sensitive, the alignment site tends to match to the wrong location, which causes false alignment and subsequent premap and pixel-to-design alignment (PDA) interruption. In addition, if alignment algorithms are more sensitive, the alignment fails frequently due to process change, which causes the runtime images to vary from the setup images thereby causing instant alignment interruption. There is also no solution to align runtime wafers with missing or damaged alignment sites.

The QLIVBM embodiments described herein have a number of important advantages over the currently used methods. One such advantage is that they can reduce, and even eliminate, false alignment during runtime on wafer inspection platforms. Another advantage is that they can accomplish substantially high confidence wafer alignment and die corner determination during runtime on wafer inspection platforms even if the alignment site is non-optimal, including severely damaged or even completely missing sites.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment relates to a system configured for image alignment. One embodiment of such a system is shown in FIG. 1. The system includes imaging subsystem 100 configured to generate images of a specimen. The imaging subsystem includes and/or is coupled to a computer subsystem, e.g., computer subsystem 36 and/or one or more computer systems 102.

The terms "imaging system" and "imaging subsystem" are used interchangeably herein and generally refer to the hardware configured for generating images of a specimen. In general, the imaging subsystems described herein include at least an energy source and a detector. The energy source is configured to generate energy that is directed to a specimen. The detector is configured to detect energy from the specimen and to generate output responsive to the detected energy.

In a light-based imaging subsystem, the energy directed to the specimen includes light, and the energy detected from the specimen includes light. For example, as shown in FIG. 1, the imaging subsystem includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen, the characteristics of the specimen to be measured, etc.

The illumination subsystem may be configured to direct the light to the specimen at different angles of incidence. For example, the imaging subsystem may be configured to alter one or more parameters of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence. The illumination subsystem may have any other suitable configuration known in the art for directing the light to the specimen at one or more angles of incidence sequentially or simultaneously.

The illumination subsystem may also be configured to direct light with different characteristics to the specimen. For example, optical element 18 may be configured as a spectral filter and the properties of the spectral filter can be changed in a variety of different ways (e.g., by swapping out one spectral filter with another) such that different wavelengths of light can be directed to the specimen at different times.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. The light may be scanned over the specimen in any suitable fashion such as in a serpentine-like path or in a spiral path.

The imaging subsystem includes one or more detection channels. At least one of the detection channel(s) includes a detector configured to detect light from the specimen due to illumination of the specimen by the system and to generate output responsive to the detected light. The imaging subsystem shown in FIG. 1 includes two detection channels, one formed by collector 24, element 26, and detector 28 and another formed by collector 30, element 32, and detector 34. The two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

In FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). The detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels is configured to collect light at different scattering angles than each of the other collectors.

As described further above, one or more of the detection channels may be configured to detect scattered light. Therefore, the imaging subsystem shown in FIG. 1 may be configured for dark field (DF) imaging. However, the imaging subsystem may also or alternatively include detection channel(s) that are configured for bright field (BF) imaging. Therefore, the imaging subsystems described herein may be configured for only DF, only BF, or both DF and BF imaging. Although each of the collectors are shown in FIG. 1 as single refractive optical elements, each of the collectors may include refractive optical element(s) and/or reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the light such as intensity but may not be configured to detect such characteristics as a function of position within the imaging plane. As such, the output that is generated by each of the detectors in each of the detection channels may be signals or data, but not image signals or image data. In such instances, a computer system may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors as described further herein. Computer subsystem 36 may be further configured as described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer system, then the different computer systems may be coupled to each other such that images, data, information, instructions, etc. can be sent between the computer systems. For example, computer subsystem 36 may be coupled to computer system(s) 102 as shown by the dashed line in FIG. 1 by any suitable transmission media, which may include any suitable wired and/or wireless transmission media known in the art. Two or more of such computer systems may also be effectively coupled by a shared computer-readable storage medium (not shown).

In an electron beam imaging subsystem, the energy directed to the specimen includes electrons, and the energy detected from the specimen includes electrons. In one such embodiment shown in FIG. 2, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 1.

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to perform any step(s) described herein. A system that includes the imaging subsystem shown in FIG. 2 may be further configured as described herein.

FIGS. 1 and 2 are provided herein to generally illustrate configurations of an imaging subsystem that may be included in the system embodiments described herein. Obviously, the imaging subsystem configurations described herein may be altered to optimize the performance of the imaging subsystem as is normally performed when designing a commercial imaging system. In addition, the systems described herein may be implemented using an existing imaging subsystem (e.g., by adding functionality described herein to an existing inspection system) such as the tools that are commercially available from KLA Corp., Milpitas, Calif. For some such systems, the methods described herein may be provided as optional functionality of the imaging subsystem (e.g., in addition to other functionality of the imaging system). Alternatively, the imaging subsystem described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 2 except that the electron beam source may be replaced with any suitable ion beam source known in the art. In addition, the imaging subsystem may include any other suitable ion beam system such as those included in commercially available focused ion beam (FIB) systems, helium ion microscopy (HIM) systems, and secondary ion mass spectroscopy (SIMS) systems.

The imaging subsystem may be configured to generate output, e.g., images, of the specimen with multiple modes. In general, a "mode" is defined by the values of parameters of the imaging subsystem used for generating images of a specimen (or the output used to generate images of the specimen). Therefore, modes may be different in the values for at least one of the parameters of the imaging subsystem (other than position on the specimen at which the output is generated). For example, the modes may be different in any one or more alterable parameters (e.g., illumination polarization(s), angle(s), wavelength(s), etc., detection polarization(s), angle(s), wavelength(s), etc.) of the imaging subsystem. The imaging subsystem may be configured to scan the specimen with the different modes in the same scan or different scans, e.g., depending on the capability of using multiple modes to scan the specimen at the same time.

In a similar manner, the electron beam subsystem may be configured to generate images with two or more modes, which can be defined by the values of parameters of the electron beam subsystem used for generating images for a specimen. Therefore, modes may be different in the values for at least one of the electron beam parameters of the electron beam subsystem. For example, different modes may use different angles of incidence for illumination.

The imaging subsystems described herein may be configured as an inspection system, a metrology system, and/or a defect review system. For example, the embodiments of the imaging subsystem shown in FIGS. 1 and 2 may be modified in one or more parameters to provide different imaging capability depending on the application for which it will be used. In one such example, the imaging subsystem may be configured to have a higher resolution if it is to be used for metrology rather than for inspection. In other words, the embodiments of the imaging subsystem shown in FIGS. 1 and 2 describe some general and various configurations for an imaging subsystem that can be tailored in a number of manners that will be obvious to one skilled in the art to produce systems having different imaging capabilities that are more or less suitable for different applications.

In this manner, the imaging subsystem may be configured for generating output that is suitable for detecting or re-detecting defects on the specimen in the case of an inspection system or a defect review system, respectively, and for measuring one or more characteristics of the specimen in the case of a metrology system. In an inspection system, computer subsystem 36 shown in FIG. 1 may be configured for detecting defects on specimen 14 by applying a defect detection method or algorithm to output generated by one or more of the detectors. In a defect review system, computer subsystem 124 shown in FIG. 2 may be configured for re-detecting defects on specimen 128 by applying a defect re-detection method to the output generated by detector 134 and possibly determining additional information for the re-detected defects using the output generated by the detector. In a metrology system, computer subsystem 36 shown in FIG. 1 may be configured for determining one or more characteristics of specimen 14 using the output generated by detectors 28 and/or 34. The system may be further configured for detecting or re-detecting defects on the specimen, determining characteristics of the specimen, determining other information for the specimen, etc. as described further herein.

As noted above, the imaging subsystem is configured for scanning energy (e.g., light, electrons, etc.) over a physical version of the specimen thereby generating output for the physical version of the specimen. In this manner, the imaging subsystem may be configured as an "actual" subsystem, rather than a "virtual" subsystem. However, a storage medium (not shown) and computer system(s) 102 shown in FIG. 1 may be configured as a "virtual" system. In particular, the storage medium and the computer system(s) may be configured as a "virtual" imaging system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., which are incorporated by reference as if fully set forth herein. The embodiments described herein may be further configured as described in these patents.

The system includes a computer subsystem, which may include any configuration of any of the computer subsystem(s) or system(s) described above. The computer subsystem is configured for separately aligning candidate alignment target images (also referred to herein simply as "candidate images") in the images generated for the specimen to corresponding setup images for setup alignment targets selected to have mutually linearly independent vectors between locations of the setup alignment targets and a reference location. In this manner, QLIVBM utilizes a group of unique kernel images and their corresponding linear independent vectors determined during the setup of alignment and applies them during runtime alignment to greatly reduce the likelihood of false alignment and failed alignment site on wafer inspection platforms (and other platforms described herein).

The computer subsystem may be configured for selecting the setup alignment targets, as shown in step 300 of FIG. 3. Alternatively, another method or system may select the setup alignment targets, and the computer subsystem may acquire information for the setup alignment targets from a storage medium in which the information has been stored. The information may include the setup images for the setup alignment targets, their corresponding mutually linearly independent vectors, and any other information generated for the setup alignment targets (such as that shown in FIG. 6 described further herein). The computer subsystem or the other method or system may select the setup alignment targets as described further herein or in any other manner known in the art.

In one embodiment, the setup alignment targets include at least two alignment targets selected to include patterns that are unique with respect to each other. For example, setup 300 may include kernel pre-slicing to target unique candidates with mutually linearly independent vectors between locations of the unique candidates and a reference location. Kernel pre-slicing may basically include separating a setup image into N unique candidate kernel images or N candidates. The terms "candidate alignment targets" and "candidates" are used interchangeably herein. In this manner, the setup alignment targets described herein are preferably unique with respect to each other in both the patterns contained within as well as their linear independent vectors to the reference location. Such setup alignment targets may be identified from a design for the specimen, e.g., a design image or other design data, which may include any of the design information known in the art for the specimens described herein. In addition or alternatively, the setup alignment targets may be selected from one or more specimen images generated for the specimen by the imaging subsystem. The patterns may be unique with respect to each other in any suitable manner, e.g., in pattern shape, orientation, size, number, period, etc.

The setup phase may also include collecting setup images (also referred to herein as "kernel images" and "kernels") for the setup alignment targets, as shown in step 302. In this step, a setup image may be collected for each of the setup alignment targets. Collecting the setup images may include extracting images for the setup alignment targets from specimen image(s) generated for the specimen. When the setup alignment targets are selected from specimen image(s) generated by the imaging subsystem, the same image(s) may be used to extract the setup alignment target images. When the setup alignment targets are selected from design information for the specimen, collecting the setup images may include grabbing images of the specimen with the imaging subsystem at locations at which the setup alignment targets are formed on the specimen. The locations of the setup alignment targets on the specimen may be determined in any suitable manner known in the art. The size and shape of the candidate kernels may vary for a number of reasons (e.g., the size may be increased to increase the uniqueness of the candidates), and the setup images described herein may have any suitable size and shape. Collecting the setup images may also include storing the setup images in a computer-readable storage medium as described further herein so that the setup images can be accessed and used during a process performed on the specimen.

The setup phase may further include calculating the mutually linearly independent vectors for each of the selected setup alignment targets, as shown in step 304, which may be performed in any suitable manner known in the art. In general, the mutually linearly independent vectors may be determined from the centers of the setup alignment targets to a reference location. The mutually linearly independent vectors, like the locations of the candidate images and the reference location, may be determined in any suitable coordinates such as coordinates with respect to the specimen, coordinates with respect to the images, coordinates with respect to the imaging subsystem, etc. Such coordinates may also be used to translate the vectors and the locations to other coordinate systems such as design coordinates with respect to a design for the specimen.

Figure 5:
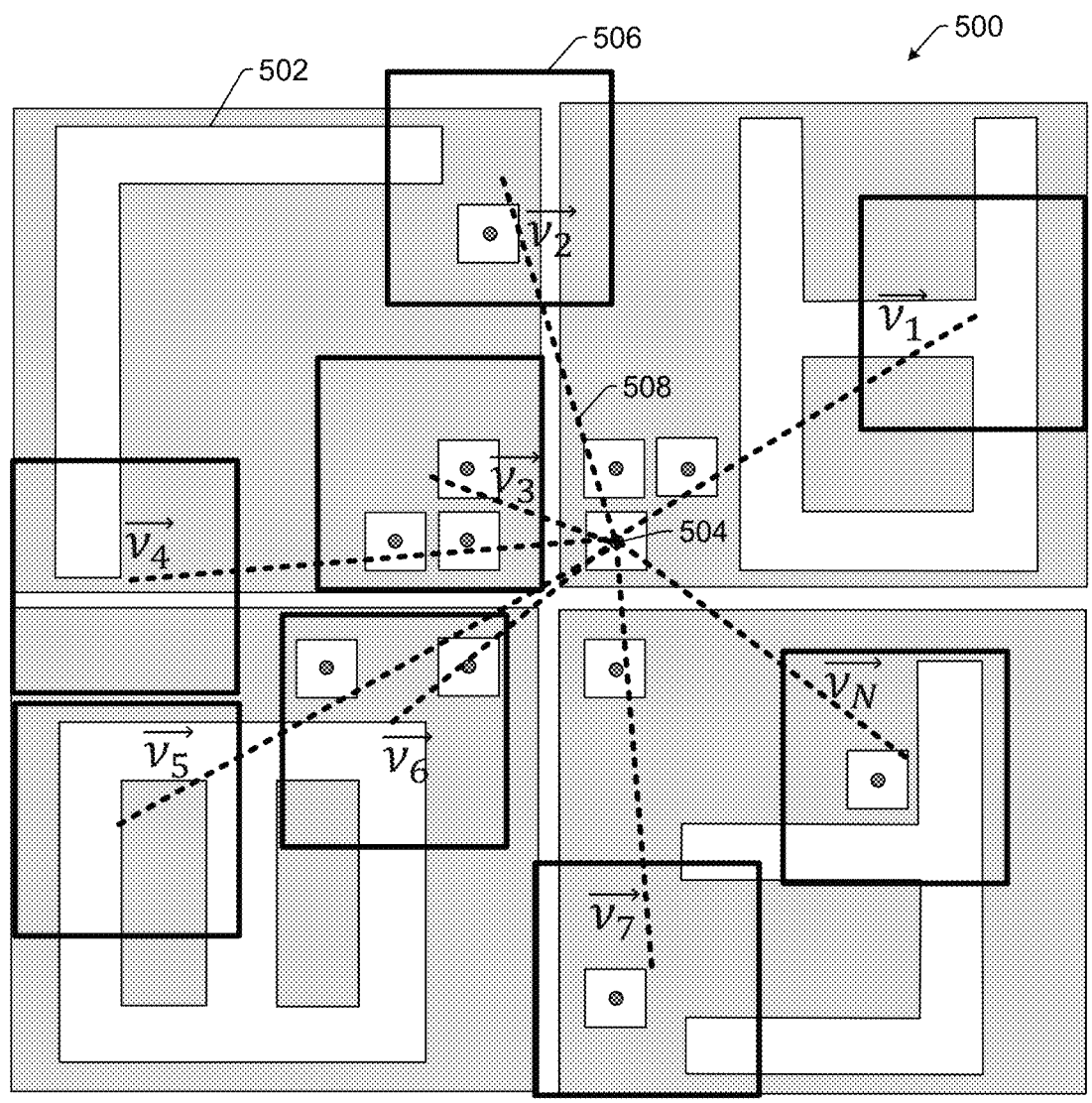
FIG. 5 is a schematic diagram illustrating a plan view of an embodiment of setup alignment targets selected to have mutually linearly independent vectors between locations of the setup alignment targets and a reference location.

In another embodiment, each of the setup alignment targets are located within a die on the specimen, and the reference location is a corner of the die. For example, as shown in FIG. 5, die 500 includes patterns 502 formed therein, which are the patterns that are being formed on the specimen. Patterns 502 are shown here only to further understanding of the invention and are not representative of any actual patterns that may be formed on the specimens described herein. Die 500 also includes die corner 504, which can be used as the reference location in the embodiments described herein. In this manner, the die corner may not be located along the external periphery of the die but may be an internal corner as shown in FIG. 5. As further shown in FIG. 5, 8 setup alignment targets 506 have been selected within the die, each having a mutually linearly independent vector 508 between its center and the reference location, die corner 504. In other words, as shown in FIG. 5, the mutually linearly independent vectors between the setup alignment targets and the reference location are different for each setup alignment target. The mutually linearly independent vectors may be determined by the computer subsystem in any suitable manner known in the art or may be user input during setup. As shown in FIG. 5, each of the setup alignment targets contain patterns that are unique compared to the patterns in each of the other setup alignment targets.

Although 8 setup alignment targets are shown in FIG. 5, the computer subsystem may select and/or use any suitable number of setup alignment targets. For instance, a minimum number of setup alignment targets may be 2, and an ideal number of setup alignment targets may be between 5 and 10. The number of setup alignment targets that are selected may vary depending on, for example, the number of unique patterns that are available in the specimen design, information for how well the patterns are expected to be formed on the specimen in the fabrication process(es), any throughput considerations that may make fewer setup alignment targets more attractive, etc.

The die may be any suitable die on the specimen, and although embodiments may be described herein with respect to a reference location that is a die corner, the reference location may be any other suitable reference location in any suitable area on the specimen. For example, the reference location may be a reference location of a field in a design for the specimen. In addition, the embodiments described herein can be used for any type of alignment that can be performed using a reference location in one of the processes described herein. For example, the alignment can be performed to align to a specimen location (instead of a design for the specimen). However, the alignment can also be performed for align-to-design type applications like pixel-to-design alignment (PDA) in which a specimen image is aligned to design coordinates for the design formed on the specimen. The alignment may also be performed for a single image, multiple images, a single swath or multiple swaths of images, images for only a portion of a specimen, images generated for a whole specimen (or the entire imaged area of the specimen), etc.

Figure 6:
FIG. 6 is a table illustrating an embodiment of the data that may be recorded for the setup alignment targets during the setup phase.
Figure 6:
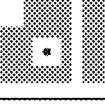
Figure 6:
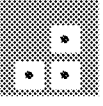
Figure 6:
Figure 6:
Figure 6:
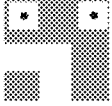
Figure 6:
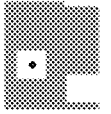
Figure 6:
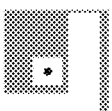

The setup phase may include outputting information for the selected setup alignment targets so that the information may be used during runtime. As shown in FIG. 6, the information for the selected setup alignment targets may be stored and output in a table, but the results may be stored in any other suitable file or format. The information may be output and stored in a computer-readable storage medium as described further herein.

The setup may also be performed once with a setup wafer, e.g., the first wafer available for a given design and process step (or level), and then the results of the setup phase may be reused for all other wafers formed with the same design and process step (or level). If there are any changes to the design (including any materials used in the design), the fabrication conditions, or anything else that will change how the wafers appear in images generated by the imaging subsystem, then the setup phase may be performed again for another wafer. In this manner, the setup phase may be performed once for a specimen and then the same setup information may be reused for all specimens of the same type unless or until there is a change in the specimens. In other words, the setup phase described herein does not have to be performed for each specimen for which alignment will be performed in runtime.

In the table shown in FIG. 6, the different setup alignment targets may be assigned a candidate number as shown in the first column, which can be used as its setup alignment target ID. The candidate numbers shown in the first column of the table correspond to the mutually linearly independent vector subscripts of the setup alignment targets shown in FIG. 5, which is also shown in the last column in FIG. 6. In other words, candidate 1 in FIG. 6 is the setup alignment target shown in FIG. 5 having mutually linearly independent vector, $\vec{v}_1$, shown in the last column of FIG. 6 for candidate 1, candidate 2 in FIG. 6 is the setup alignment target shown in FIG. 5 having mutually linearly independent vector, $\vec{v}_2$, shown in the last column of FIG. 6 for candidate 2, and so on.

The results of the setup phase may also include candidate kernels for the setup alignment targets as shown in the second column of the table shown in FIG. 6. These candidate kernel images may be extracted from the specimen image in any suitable manner known in the art. In addition, the candidate kernel images may have any suitable size known in the art.

The results of the setup phase may further include coordinates of the candidates' kernel centers determined during setup as shown in the third column of the table in FIG. 6. In other words, (Xs1, Ys1) are the coordinates of the center of the kernel image for setup alignment target candidate 1, and mutually linearly independent vector, $\vec{v}_1$, is the vector between those coordinates and the coordinates of the die corner; (Xs2, Ys2) are the coordinates of the center of the kernel image for setup alignment target candidate 2, and mutually linearly independent vector, $\vec{v}_2$, is the vector between those coordinates and the coordinates of the die corner; and so on.

The computer subsystem may separately align candidate images in the images generated for the specimen to corresponding setup images for setup alignment targets in the runtime phase as shown in FIG. 4. For example, as shown in step 400, the imaging subsystem may generate runtime specimen images, which may be performed as described further herein. In step 402, the computer subsystem may get a candidate alignment target image (from the runtime specimen images) and a setup image (from where they are stored) for the current candidate. The current candidate may be any of the setup alignment targets, e.g., one of the setup alignment targets identified to be used first.

In step 404, the computer subsystem may perform image alignment for the current candidate with the current alignment method. If there is only one alignment method available for use in the process, then the current alignment method may be that one alignment method. If there are multiple alignment methods available for use, then the current alignment method may be any of the alignment methods (e.g., one of the alignment methods identified to be used first, one of the alignment methods randomly selected by the computer subsystem, etc.). In this manner, step 404 may include inputting kernel candidate images and runtime candidate images into one of multiple alignment methods or algorithms, which may include any suitable alignment methods or algorithms known in the art such as matrix image library (MIL) pattern matching function, edge detection matching, context based algorithms, etc.

In step 406, the computer subsystem may determine if the candidate and setup images for the current candidate have been successfully aligned with the current alignment method. Determining if the candidate and setup images have aligned may be performed in any suitable manner. For example, the computer subsystem may compare any result of the alignment step to one or more predetermined criteria to determine if the images have been successfully aligned. The computer subsystem may also or alternatively generate a score that is responsive to how well the images have been aligned to each other. Any of such results or a characteristic of the aligning step results may be used to determine which of the alignment results are used for other steps described herein. For example, the computer subsystem may remove aligned but relatively low score alignment sites from being used in other steps described herein. The computer subsystem may also or alternatively try another alignment method for such low scoring alignment sites to see if a better alignment score can be achieved with a different alignment method. The computer subsystem may then determine which steps to perform next based on if alignment has been achieved for the current candidate with the current alignment method.

In some embodiments, for at least one of the candidate images, the computer subsystem is configured for separately aligning the candidate image to its corresponding setup image with two or more alignment methods until the candidate image successfully aligns to its corresponding setup image. Therefore, the computer subsystem may perform image alignment for a candidate with different alignment methods until at least one successful image alignment has been achieved for that candidate. The aligning step may be performed in this manner in different ways described further herein. In particular, for any one candidate, the aligning step may be performed with one alignment method, then with another alignment method, and so on until all alignment methods have been tried or until a successful alignment has been achieved. Alternatively, for any one alignment method, the aligning step may be performed for one candidate, then another, and so on until all candidates have been tried or enough successful alignments have been achieved. If all candidates are facing failure or not enough successful alignments have been achieved with the one alignment method, then the computer subsystem may try the next alignment method.

In some instances, when the computer subsystem determines that images were not aligned for the current candidate with the current alignment method, the computer subsystem may try image alignment for other candidates. For example, when the computer subsystem determines in step 406 that the images for the current candidate have not been successfully aligned, the computer subsystem may determine if there are any untried candidates in step 422. When the computer subsystem determines that there are untried candidates, the computer subsystem may select one of the untried candidates as the new candidate in step 424. The computer subsystem may then get the candidate alignment target image and setup image for the new (and now current) candidate in step 402 and reperform image alignment step 404 for the new (and now current) candidate. In this manner, when the runtime and setup images for one of the candidates do not match or are not successfully aligned, the computer subsystem may move to the next candidate, until candidate N has been tried (where N=total number of setup alignment targets).

In a further embodiment, the computer subsystem is configured for performing the separately aligning step with a first alignment method, and when none of the candidate alignment target images successfully align with its corresponding setup image, the computer subsystem is configured for performing the separately aligning step with a second alignment method. For example, as described above, the computer subsystem may move from candidate to candidate with one alignment method until all candidates have been tried with that alignment method. The computer subsystem may then proceed to try one or more other alignment methods, e.g., for any of the candidates that were not successfully aligned, when none of the candidates have been successfully aligned with the current alignment method, or even to try aligning all of the candidates again with a new method. For example, when the computer subsystem determines in step 406 that the images were not successfully aligned for the current candidate with the current alignment method and when the computer subsystem determines in step 422 that all candidates have been tried, the computer subsystem may then determine if all alignment methods have been tried. If the computer subsystem determines that there are one or more untried alignment methods, the computer subsystem may select one of the untried alignment methods to become the current alignment method. The image alignment and other steps described herein may then be performed with the new alignment method for any of the candidates whose images have not yet been successfully aligned and/or for all of the candidates. These steps may be performed for any or all of the alignment methods.

In another embodiment, the separately aligning step is performed with a first alignment method, and when none of the candidate images successfully aligned with its corresponding setup image, the computer subsystem is configured for repeating the separately aligning step with one or more additional alignment methods, which may be performed as described above. In this embodiment, when none of the candidate images successfully aligned with its corresponding setup image with the one or more additional alignment methods, the computer subsystem is configured for aborting the steps of the process. For example, when the computer subsystem determines in step 434, that there are not any more untried alignment methods, the computer subsystem may proceed to step 438 to determine if any (or how many) of the images have been successfully aligned with any of the alignment methods. If no images have been successfully aligned with any of the alignment methods, the computer subsystem may abort the process in step 442.

As described above, therefore, the computer subsystem may try one alignment method for all candidates, and then try one or more other alignment methods for some or all of the candidates. However, for any one candidate, the computer subsystem may try different alignment methods (all of them or until a successful alignment has been found) and then move to the next candidate and repeat the same steps for the next candidate. In one such example, when the computer subsystem determines that images were not aligned for the current candidate with the current alignment method, the computer subsystem may try other alignment method(s) for the current candidate, e.g., until the images are successfully aligned for the current candidate. In other words, if the computer subsystem determines in step 406 that the images were not successfully aligned for the current candidate with the current alignment method, the computer subsystem may determine if there are any untried alignment methods for the current candidate. If the computer subsystem determines that there are any untried alignment methods, the computer subsystem may select a new alignment method from the untried ones. The newly selected alignment method then becomes the current alignment method, and the computer subsystem may perform image alignment in step 404 with the new, current alignment method.

In this manner, for any one candidate, image alignment may be performed with different alignment methods until the images for the candidate are aligned or when there are no more alignment methods. When the computer subsystem determines in step 406 that the images are not aligned and determines that there are no more alignment methods, the computer subsystem may determine if there are any more untried candidates. The computer subsystem may select one of the untried candidates as the next candidate, and then re-perform step 402 to get the candidate alignment target and setup images for the next (and now current) candidate and step 404 to align the images for the next (and now current) candidate with the current alignment method. In this manner, the computer subsystem may perform the same steps for any of the untried candidates (performing image alignment with different methods until the images successfully align). In the same manner described above, if the computer subsystem has tried all candidates and all alignment methods, the computer subsystem may proceed to step 438 to determine if any images have been aligned. If the computer subsystem determines in step 438 that none of the images have been aligned, the computer subsystem may abort the method in step 442. In this manner, when no candidates have been successfully aligned (either no candidates have been aligned or only false alignment has occurred) and all the alignment methods have been tried, the computer subsystem may abort the alignment attempts.

For each of one or more of the candidate images successfully aligned to its corresponding setup image, the computer subsystem is configured for separately determining coordinates of the reference location in the images generated for the specimen from coordinates for each of the one or more candidate images and its corresponding mutually linearly independent vector. For example, when the computer subsystem determines in step 406 that the images have been successfully aligned for the current candidate, the computer subsystem may determine coordinates of the reference location for the current candidate in step 408. Determining the reference location for any one of the candidates that has been successfully aligned may include a vector addition operation and recording the die corner location for that one candidate, which may be performed as described further herein.

When the computer subsystem determines the reference location coordinates for any candidate whose runtime image has been successfully aligned to its setup image, the computer subsystem may determine if there are any untried candidates in step 422. When there are untried candidates, the computer subsystem may select the next candidate in step 424. The computer subsystem may then get the candidate alignment target and setup images for the new candidate in step 402 and perform image alignment for the new candidate in step 404. Other steps described above may also be performed for the new candidate. In this manner, when the images for a candidate have been successfully aligned to each other, the calculated reference location coordinates may be recorded, and the computer subsystem may move to the next candidate until all candidates have tried (until candidate #N).

The computer subsystem is also configured for determining final coordinates of the reference location in the images generated for the specimen from the separately determined coordinates of the reference location. Determining the final coordinates of the reference location may include, first, determining how many of the candidate images successfully aligned to their respective corresponding setup images. For example, as described further herein, the final coordinates of the reference location may be determined in different ways depending on how many of the candidate images were successfully aligned.

Determining how to calculate the final reference location coordinates based on how many of the candidate images successfully aligned to its corresponding setup image is important for a number of reasons. For example, this step can eliminate individual reference location coordinates determined from alignment target images that were poorly aligned or not aligned at all. Such unsuccessful alignment of the runtime and setup alignment target images may occur, for example, when defects are present in the alignment targets formed on the specimen.

Figure 7:
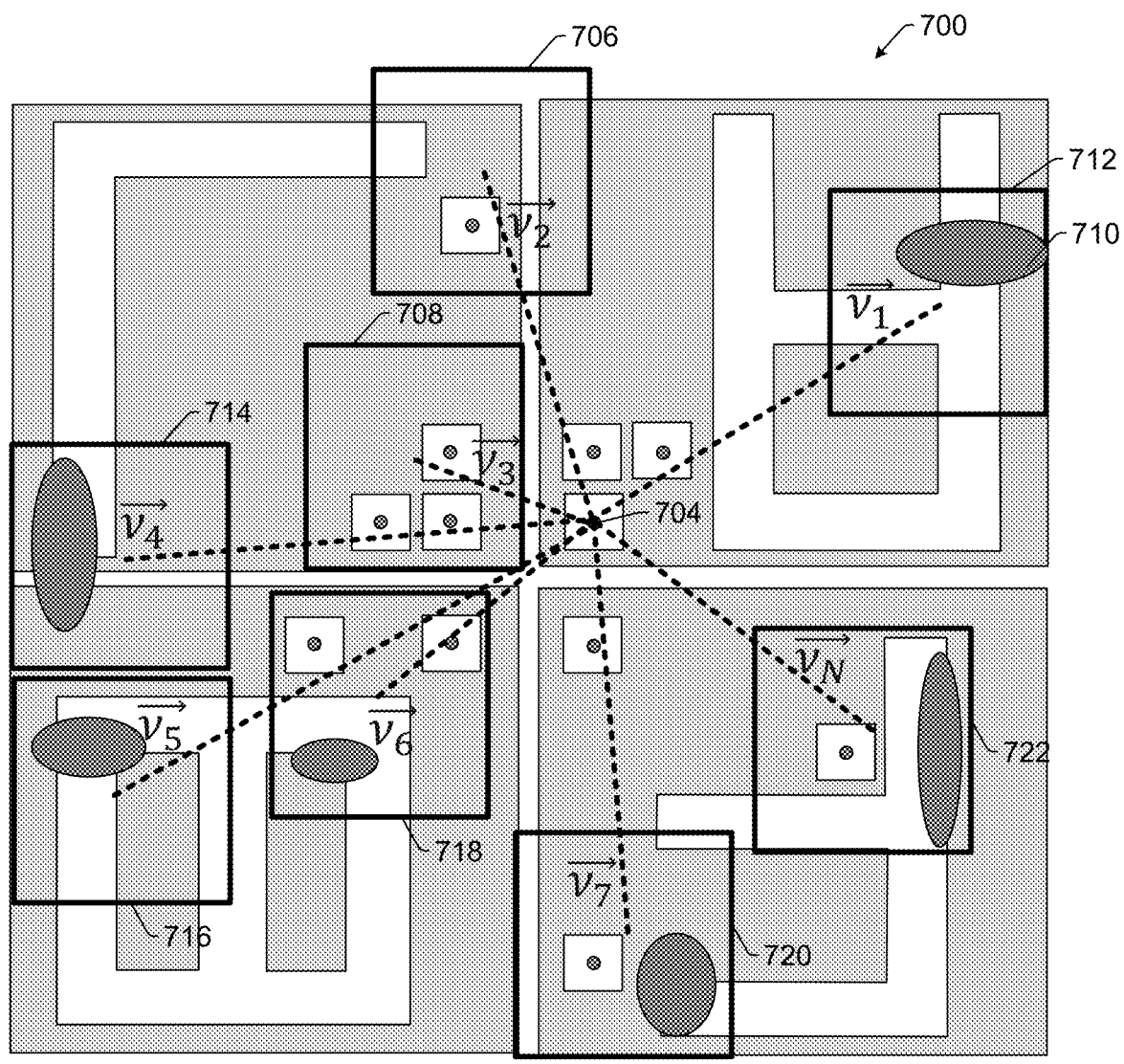
FIG. 7 is a schematic diagram illustrating a plan view of an embodiment of candidate alignment target images in an image generated for a specimen that may be separately aligned to their corresponding setup images for the setup alignment targets shown in FIG. 5.

In one such example, as shown in FIG. 7, die 700 may be formed on the specimen and have reference location 704, which are the same as in the setup phase shown in FIG. 5. Defects (or particles, foreign material, etc.) shown by darker gray ovals 710 may however also be formed (or be present) on the specimen. In particular, defects are present in candidate images for setup alignment targets 712, 714, 716, 718, 720, and 722. These defects can interfere with the alignment of the candidate images for these setup alignment targets to their corresponding setup images. Therefore, step 406 shown in FIG. 4 may determine that the images are not aligned for these candidates, and these candidates may be eliminated from use in determining the final coordinates of the reference location.

In contrast, defects are not present in candidate images for setup alignment targets 706 and 708 shown in FIG. 7. Therefore, the alignment of the candidate images for setup alignment targets 706 and 708 should be successful (in the absence of any other interfering factors), and step 406 shown in FIG. 4 should determine that the images are aligned for these candidates.

Figure 8:
FIG. 8 is a table illustrating an embodiment of the data that may be recorded for the candidate alignment target images during the runtime phase.
Figure 8:
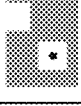
Figure 8:
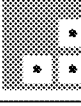
Figure 8:
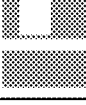
Figure 8:
Figure 8:
Figure 8:
Figure 8:

During or after the runtime alignment phase, the computer subsystem may generate results for the setup alignment targets as shown in FIG. 8. The first two columns shown in this table are the same as those shown in FIG. 6. The third column in the table of FIG. 8, however, shows the coordinates of the candidates' kernel centers during runtime instead of the setup coordinates of the candidates' kernel centers. The coordinates of the centers of the candidates' kernel images may be determined in any suitable manner known in the art. The vector from the kernel center to the die corner shown in the last column of the table in FIG. 8 is the same as that shown in FIG. 6.

FIG. 8 may also include some indication of which of the candidate images have been successfully aligned to their corresponding setup images and therefore which of the candidates can be used for determining the final coordinates of the reference location. For example, box 800 shown in FIG. 8 may be used to indicate that only setup alignment targets 706 and 708 shown in FIG. 7 should be used for determining the final coordinates of the reference location.

As shown in FIG. 8, the information generated in runtime for the selected setup alignment targets may be stored and output in a table, but the results may be stored in any other suitable file or format. The information may be output and stored in a computer-readable storage medium as described further herein.

In one embodiment, when two or more candidate images successfully aligned to their respective corresponding setup images, the computer subsystem is configured for determining if the coordinates of the reference location separately determined for each of the two or more candidate images converge to within a predetermined distance of each other. For example, when the computer subsystem determines in step 422 that there are not any more untried candidates, the computer subsystem may determine in step 426 if reference location coordinates have been determined for more than one candidate. If the computer subsystem determines that reference location coordinates have been determined for more than one candidate, the computer subsystem may determine in step 428 if at least some of the reference location coordinates converged. Determining if the reference location coordinates converged may include determining if the separately determined reference location coordinates are within a radius of, for example, 500 nm (or some other predetermined distance) of each other.

When two or more of the candidate images successfully align to their corresponding setup images, determining if the coordinates of the reference location separately determined for each of the two or more candidate images converge can be advantageously performed before runtime die corner determination for false alignment avoidance. In other words, this step can identify any candidates whose images appear to have been successfully aligned to the setup images but have actually been falsely aligned, based on whether the die coordinates determined for each of the candidates are within a certain distance of each other.

To illustrate this further, assume that candidate images for candidates 2, 3, and N shown in FIG. 5 have been determined to successfully align with their corresponding setup images during runtime. The computer subsystem may then determine the DC location for candidate 2 as:

$$(x_2, y_2) = (Xr2, Yr2) + \vec{v_2}$$

the DC location of candidate 3 as:

$$(x_3, y_3) = (Xr3, Yr3) + \vec{v_3}$$

and the DC location for candidate N as:

$$(x_N, y_N) = (XrN, YrN) + \vec{v_N}$$

Since $\vec{v_2}, \vec{v_3}, \ldots \vec{v_N}$ are mutually linearly independent, if and only if the computer subsystem determines that the calculated die corner locations determined separately for these 3 candidates converge, namely:

$$\sqrt{(x_2 - x_3)^2 + (y_2 - y_3)^2} < \text{predetermined distance and}$$

$$\sqrt{(x_2 - x_N)^2 + (y_2 - y_N)^2} < \text{predetermined distance and}$$

$$\sqrt{(x_3 - x_n)^2 + (y_3 - y_N)^2} < \text{predetermined distance}$$

(where the predetermined distance is, e.g., 500 nm or a distance determined by the locational accuracy of the alignment method), then the computer subsystem will determine that these separately determined die corner locations should all be used for final coordinate determination.

In one such embodiment, the computer subsystem is configured for determining the final coordinates with only the separately determined coordinates of the reference location determined to converge to within the predetermined distance of each other. For example, when the computer subsystem determines in step 428 that at least some of the reference location coordinates have converged, the computer subsystem may eliminate reference location coordinates that are not converged in step 430. The computer subsystem may then determine the final coordinates of the reference location in step 432 from the remaining reference location coordinates as described further herein. In this manner, the reference location coordinates that are not within the predetermined distance of each other may be eliminated from the final reference location coordinates calculations, which advantageously enables true high confidence alignment to be achieved and substantially high accuracy final reference location coordinates to be determined.

In another such embodiment, the computer subsystem is configured for determining the final coordinates with all of the separately determined coordinates of the reference location determined to converge to within the predetermined distance of each other. For example, one way that the embodiments described herein increase the robustness of the final coordinate determination for the reference location is by using as many of the separately determined reference location coordinates that are determined to converge. For example, if in the above described example, the computer subsystem determines that the die corner location coordinates determined for candidates 2, 3, and N converge to within the predetermined distance, the computer subsystem may determine the final coordinates of the die corner (DC) as:

$$(x_{DC}, y_{DC}) = \frac{1}{A}(x_2 + x_3 + x_N, y_2 + y_3 + y_N)$$

where A is the number of candidates successfully aligned to their corresponding setup images and whose separately determined coordinates of the reference location are determined to converge to within the predetermined distance of each other. In this manner, precise die coordinates can be determined using only the candidates for which alignment has been accomplished (and confirmed by the application of the convergence criteria).

In a further such embodiment, the separately aligning step is performed with a first alignment method, and when the coordinates of the reference location separately determined for each of the two or more candidate images are determined to not converge to within the predetermined distance of each other, the computer subsystem is configured for repeating the separately aligning with a second alignment method. For example, if the reference location coordinates separately determined for the candidates do not converge to within the predetermined distance of each other, that may indicate that only false alignments have occurred up to that point. As such, when the computer subsystem determines in step 428 that none of the reference location coordinates have converged, the computer subsystem may proceed to step 434 to determine if there are any untried alignment methods. If there are any untried alignment methods, the computer subsystem may select one of the untried alignment methods as the next alignment method in step 436. The computer subsystem may then repeat the steps described above with the next alignment method (e.g., by repeating at least step 404 with the next alignment method).

When alignment is achieved with more than one candidate (as determined in 426) and when at least some of the reference locations coordinates are determined to not converge (in step 428), then the computer subsystem may determine if there are any untried alignment methods (in step 434). When there are one or more untried alignment methods, the computer subsystem may select the next alignment method as shown in step 436 and the steps performed up to that point may be performed with the next alignment method. However, when there are no more untried alignment methods, the computer subsystem may determine the number of aligned images in step 438. When the computer subsystem determines that the number of aligned images is greater than one in step 438, but their reference location coordinates do not converge and all alignment methods have been tried, the computer subsystem may determine that this is a false alignment situation and abort the process in step 442. When alignment has not been achieved with any of the candidates and all aligned methods have been tried, the computer subsystem determines in step 438 that the number of images aligned is 0, and the computer subsystem may abort the process in step 442.

In some such embodiments, when two or more of the candidate images successfully aligned to their respective corresponding setup images with the second alignment method, the computer subsystem is configured for separately determining additional coordinates of the reference location from coordinates for each of the two or more candidate images successfully aligned with the second alignment method and its corresponding mutually linearly independent vectors, and determining if the separately determined additional coordinates of the reference location converge to within the predetermined distance of each other. In this manner, if the computer subsystem determines that there are two or more candidate images successfully aligned with the second alignment method, the computer subsystem may separately determine additional coordinates of the reference location for each of those candidate images. The computer subsystem may also then determine if the coordinates determined for those candidate images converge. These steps may be performed as described above, but only for the reference location coordinates resulting from the alignments that were successful with the second alignment method. In other words, any results previously generated with the first alignment method may be discarded or otherwise not used with the results generated with the second alignment method. Then, only the reference location coordinates resulting from successful alignment results generated with the second alignment method may be used as described herein to determine the final coordinates of the reference location.

In another embodiment, when the separately determined additional coordinates of the reference location are determined to not converge to within the predetermined distance of each other, the computer subsystem is configured for determining if there is a third alignment method. In other words, if the separately determined reference location coordinates determined with the first alignment method do not converge with each other, and if the separately determined reference location coordinates determined with the second alignment method also do not converge with each other, then the computer subsystem may determine if there are any other alignment methods that are yet untried. If there are more than two untried methods, the computer subsystem may select one of them for use as the third alignment method. These steps may be performed as described above and as many times as needed or until there are no more alignment methods to try.

In one such embodiment, when there is a third alignment method, the computer subsystem is configured for repeating the separately aligning step with the third alignment method. For example, when there is a third alignment method, the computer subsystem may repeat at least steps 404, 406, and 408 for the third alignment method. The computer subsystem may also perform additional steps for the third alignment method such as determining if any of the separately determined reference location coordinates for candidate images successfully aligned with the third alignment method converge and if they converge, determining the final reference location coordinates from the converged location coordinates.

In another such embodiment, when there is not a third alignment method, the computer subsystem is configured for aborting the steps of the process. In other words, if the reference locations separately determined for candidate images successfully aligned with the first alignment method do not converge, if the reference locations separately determined for candidate images successfully aligned with the second alignment method do not converge, and if there is not another untried alignment method, the computer subsystem may abort the process. In this manner, the embodiments described herein can avoid using false alignment results to determine the final coordinates of the reference location, which although not ideal is better than using false alignment results for other steps described herein. In addition, providing feedback about the results of the process to a user in such situations can enable the user to take other actions, like making sure that the right wafer was loaded on the tool or examining the wafer for gross defects that may have interfered with all the alignment attempts made up to that point.

In the steps described above, the computer subsystem may move from alignment method to alignment method until an alignment method is found that is capable of successfully aligning candidate images whose determined reference locations converge. In such embodiments, only the reference locations determined with a single one of the multiple alignment methods may be used. However, in other embodiments, reference locations determined from candidate images aligned to their setup images with different alignment methods may be used, in combination, to determine if the separately determined reference locations converge. If the separately determined reference location coordinates from different alignment methods converge, they may then be used in combination to determine the final reference location coordinates.

In a further embodiment, the computer subsystem is configured for performing the separately aligning step for all of the candidate images with a first alignment method; and for any of the candidate alignment target images not successfully aligned to its corresponding setup image with the first alignment method, the computer subsystem is configured for performing the separately aligning step with a second alignment method and the separately determining step for each of one or more of the candidate images successfully aligned to its corresponding setup image with the second alignment method. In other words, for runtime die corner determination with false alignment avoidance, if a candidate has not aligned with the current alignment method, the computer subsystem may move to the next alignment method and retry. For example, as described further above, steps 402, 404, and 406 shown in FIG. 4 may be performed with one alignment method for all candidate images. After alignment has been tried for all candidates with the one alignment method, the computer subsystem may determine if there are any untried alignment methods. When there is an untried alignment method, the computer subsystem may select the next alignment method. Steps 402, 404, and 406 may then be performed for all of the candidates with the next alignment method or only those candidates that have not yet been successfully aligned. When any of the candidates are successfully aligned with the first or second alignment method, the computer subsystem may determine the coordinates of the reference location for those candidates with results of the first or second alignment method, respectively, in step 408.

As with other embodiments described further herein, if no candidate has been successfully aligned, the computer subsystem may select the next alignment method and retry the alignment for each of the candidates. If all algorithms have been tried and no candidates have been successfully aligned, then the computer subsystem may abort the alignment as shown in step 442 of FIG. 4.

In one such embodiment, when at least a first of the candidate images successfully aligned to its corresponding setup image with the first alignment method and at least a second of the candidate images successfully aligned to its corresponding setup image with the second alignment method, the computer subsystem is configured for: determining if the separately determined coordinates of the reference location determined for at least the first and second candidate images converge to within a predetermined distance of each other; and performing the determining the final coordinates step with only the separately determined coordinates of the reference location determined to converge to within the predetermined distance of each other. In other words, when a successful image alignment has been achieved for any of the candidate images, the coordinates of the reference location may be determined for those candidate images regardless of whether different alignment methods were used to achieve the successful alignments. In this manner, the embodiments described herein may use, in combination, results from different alignment methods for other steps like determining the final coordinates of the reference location.

In one such example, if the candidate image for setup alignment target 1 is successfully aligned to its corresponding setup image with only alignment method 1 and the candidate images for setup alignment targets 2, 3, and n are successfully aligned to their corresponding setup images with only alignment method 2, the computer subsystem may separately determine coordinates of the reference location as described further herein for each of candidates 1, 2, 3, and n using the results of the different alignment methods. The separately determined reference location coordinates may then be input together into one or more other steps described herein. For example, in another such embodiment, the computer subsystem is configured for determining the final coordinates of the reference location with all of the separately determined coordinates that converge to within the predetermined distance of each other. In the example described above, the computer subsystem may determine if the coordinates of the reference location separately determined for each of candidates 1, 2, 3, and n converge, which may be performed as described herein. The computer subsystem may then use only the separately determined coordinates of the reference location that converged for determining the final coordinates of the reference location, which may also be performed as described further herein.

In some embodiments, when only one of the candidate images successfully aligned to its corresponding setup image, the computer subsystem is configured for determining the final coordinates of the reference location from the separately determined coordinates of the reference location determined for only the one candidate image. In this manner, if only one candidate has been successfully aligned to its corresponding image, alignment can be accomplished, but with more false alignment possibility than other embodiments described herein (e.g., when two or more candidate images are successfully aligned to their corresponding setup images). In such situations, the accuracy of the final coordinates of the die corner location may be the same as the accuracy that can be achieved by currently used alignment methods.

In one such embodiment, as shown in step 426, when the computer subsystem determines that reference coordinates are not determined for more than one candidate, and as shown in step 434, when the computer subsystem determines that there are not any more untried alignment methods, the computer subsystem may determine if the reference location coordinates have been determined for one candidate in step 438. When the computer subsystem determines that reference location coordinates have been determined for one candidate, the computer subsystem determines the final coordinates of the reference location from the one aligned candidate in step 440. In this case, if the only candidate that has been successfully aligned is candidate N, the computer subsystem may determine the final coordinates of the die corner location as:

$$(x_N, y_N) = (XrN, YrN) + \vec{v_N}$$

In this manner, if the computer subsystem can only find one successfully aligned candidate across all alignment methods and all candidates available to get the wafer aligned during runtime, the one successfully aligned candidate may be used as the best bet to determine the final reference coordinates.

Any of the die corner determination steps described herein may be modified in one or more ways. For example, instead of using all aligned candidates (or all aligned and converged candidates), the embodiments may use only a majority of all aligned candidates (or a majority of all aligned and converged candidates) for determining the die corner coordinates. In another example, the computer subsystem may be configured for determining the die corner coordinates using biased die corner calculations from aligned candidates.

The embodiments described herein have a number of advantages in addition to those already described. For example, the embodiments described herein can avoid false alignment during runtime on wafer inspection platforms. In addition, the embodiments described herein can accomplish substantially high confidence wafer alignment and die corner determination during runtime on wafer inspection platforms, even if the alignment site is non-optimal, including severely damaged or even completely missing sites. In this manner, the embodiments described herein can reduce operational interruption for all inspection platforms with alignment components for users in both high volume research and development facilities and high volume manufacturing facilities.

The embodiments described herein can also advantageously adapt to the number of candidates that match (i.e., whose candidate images have been successfully aligned to their corresponding setup images). In particular, the embodiments determine the final coordinates of the reference location in different ways depending on if only one of the candidates match or if two or more of the candidates match. In addition, the alignment confidence of the embodiments increases as the number of candidate images that have been successfully matched increases.

A further advantage of the embodiments described herein is that they can adopt all currently available alignment methods while also being able to identify only those that positively assist in the alignment, premap, and PDA alignment (e.g., by determining if alignment is successful and determining if the separately determined reference location coordinates converge). In addition, the embodiments described herein will have no significant throughput impact. For example, the images for N candidates can be grabbed and processed with a single swath during both setup and runtime.

Another advantage of the embodiments described herein is that they do not require any design intellectual property, which increases the situations in which the embodiments described herein can be useful. The embodiments also do not require any machine learning abilities or databases, which can increase the simplicity and adoption of the embodiments described herein. Furthermore, the embodiments described herein can generate substantially high confidence data that can be used to pinpoint operational mistakes (e.g., wrong wafer inspected, etc.).

Figure 9:
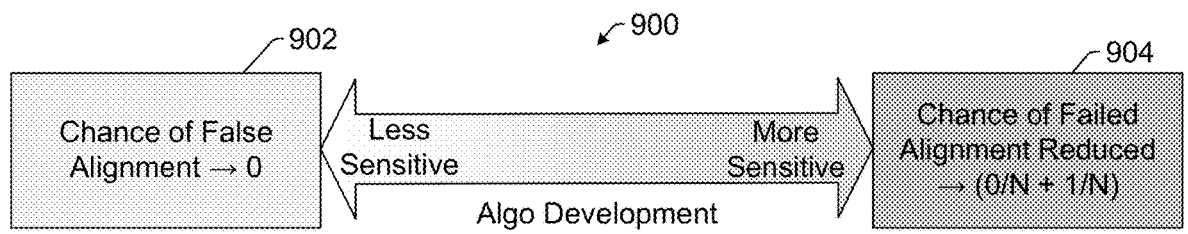
FIG. 9 is a schematic diagram illustrating some advantages of the embodiments described herein for algorithm development and alignment success.

FIG. 9 also illustrates advantages of the embodiments described herein. For example, algorithm development for the embodiments described may vary across dimension 900 from less sensitive to more sensitive. When the algorithm development is on the less sensitive side, situation 902 arises in which the chance of false alignment may go to 0, which is different than currently used methods in which false alignment, premap, and PDA interruption is possible when the algorithms are less sensitive. When the algorithm development is on the more sensitive side, situation 904 arises in which the chance of failed alignment is reduced to (0/N+1/N), which is different than currently used methods in which failed alignment interruption can occur when the algorithms are more sensitive.

During runtime, the computer subsystem may be configured for aligning different images to each other based on the final coordinates of the reference location. For example, as shown in FIG. 5, there may be N different setup alignment targets within one die, which are unique with respect to each other and have their own vector pointing to the die corner on the one die. The one die used during setup and runtime may be a reference die. An inspection recipe may generally include information for the specified reference die. Every die printed on the wafer is the same and spaced from each other by a fixed die width and height. Thus, all die coordinates on all dies can be easily translated back to their coordinates on the reference die using the known die width and height. In this manner, images for different dies on the specimen can be aligned to each other and then used for inspection or another process described herein.

Different images can be aligned to each other in the same manner using other reference locations described herein. The image-to-image alignment may also be performed in runtime for all or only some of the images generated for the specimen in the process. In addition, the image-to-image alignment based on the final coordinates of the reference location may be performed in image or specimen coordinates, or in other coordinates such as design coordinates.

In some embodiments, after aligning different images to each other during runtime using the final coordinates of the reference location, the computer subsystem is configured for detecting defects by subtracting one image (i.e., a reference image) from another image aligned to it (i.e., a test image). The results of subtracting a reference image from a test image is commonly referred to in the art as a "difference image." Detecting the defects may also include applying some threshold to the difference image, and that threshold may be commonly referred to in the art as a defect detection threshold. Only image signals or data in the difference image having a value above the threshold may be identified by the computer subsystem as a defect or potential defect. Of course, this is perhaps the most simple version of how defect detection can be performed using results of subtracting a reference image from a test image. The embodiments described herein are not limited in the defect detection method or algorithm that can be used with the images aligned to each other as described herein. For example, once the reference image has been subtracted from the test image, there are many different types of defect detection methods or algorithms that can be used to detect defects or potential defects in the resulting difference image. Any or all such defect detection methods or algorithms can be used in the embodiments described herein, and an appropriate method or algorithm can be selected based on information about the specimen.

The computer subsystem may be configured for generating results for the specimen, which may include any of the results or information described herein. The results for the specimen may be generated by the computer subsystem in any suitable manner. All of the embodiments described herein may be configured for storing results of one or more steps of the embodiments in a computer-readable storage medium. The results may include any of the results described herein and may be stored in any manner known in the art. The results for the specimen may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer subsystem described herein may include information for any defects detected on the specimen such as location, etc., of the bounding boxes of the detected defects, detection scores, information about defect classifications such as class labels or IDs, any defect attributes determined from any of the images, etc., or any such suitable information known in the art. That information may be used by the computer subsystem or another system or method for performing additional functions for the specimen and/or the detected defects such as determining defect classifications for the defects, filtering the defects to remove nuisances and/or defects not of interest, sampling the defects for defect review or other analysis, determining a root cause of the defects, etc.

In addition to the functions described above, such functions further include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the detected defects. The changes to the process may include any suitable changes to one or more parameters of the process. The computer subsystem preferably determines those changes such that the detected defects can be reduced or prevented on other specimens on which the revised process is performed, the detected defects can be corrected or eliminated on the specimen in another process performed on the specimen, the detected defects can be compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and the semiconductor fabrication system. The semiconductor fabrication system may or may not be part of the system embodiments described herein. For example, the imaging subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein can enable inspection processes and tools to detect defects with increased sensitivity due to the relatively high accuracy image alignment enabled by the embodiments described herein. This increased sensitivity to defects allows users to improve their ability to make correct processing decisions.

The embodiments described herein can also be used for setting up image alignment for and performing runtime image alignment in an image-based process like inspection, defect review, metrology, etc. The improved image alignment ability enabled by the embodiments described herein provides significant advantages for any of such processes like reduced time to results, increased robustness, better performance of the resulting process, etc.

Each of the embodiments described above may be combined together into one single embodiment. In other words, unless otherwise noted herein, none of the embodiments are mutually exclusive of any other embodiments.

Another embodiment relates to a computer-implemented method for image alignment. The method includes the separately aligning, separately determining coordinates, and determining final coordinates steps described above. The steps are performed by a computer subsystem, which may be configured according to any of the embodiments described herein.

Each of the steps of the method may be performed as described further herein. The method may also include any other step(s) that can be performed by the imaging subsystem and/or computer subsystem described herein. In addition, the method described above may be performed by any of the system embodiments described herein.

Figure 10:
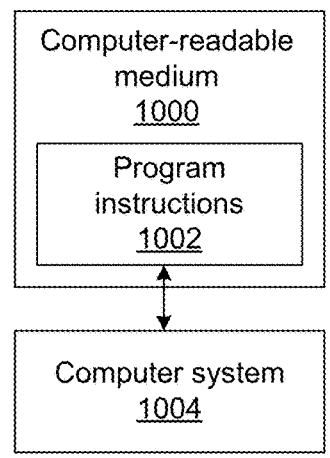
FIG. 10 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for image alignment. One such embodiment is shown in FIG. 10. In particular, as shown in FIG. 10, non-transitory computer-readable medium 1000 includes program instructions 1002 executable on computer system 1004. The computer-implemented method may include any step(s) of any method(s) described herein.

Program instructions 1002 implementing methods such as those described herein may be stored on computer-readable medium 1000. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMID Extension) or other technologies or methodologies, as desired.

Computer system 1004 may be configured according to any of the embodiments described herein.

Further modifications and alternative embodiments of various aspects of the invention will be apparent to those skilled in the art in view of this description. For example, methods and systems for image alignment are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for image alignment, comprising:
    an imaging subsystem configured to generate images of a specimen; and
    a computer subsystem configured for:
        separately aligning candidate alignment target images in the images generated for the specimen to corresponding setup images for setup alignment targets selected to have mutually linearly independent vectors between locations of the setup alignment targets and a reference location;
        for each of one or more of the candidate alignment target images successfully aligned to its one of the corresponding setup images, separately determining coordinates of the reference location in the images generated for the specimen from coordinates for said each of the one or more of the candidate alignment target images and its corresponding one of the mutually linearly independent vectors; and
        determining final coordinates of the reference location in the images generated for the specimen from the separately determined coordinates of the reference location.

2. The system of claim 1, wherein the setup alignment targets comprise at least two alignment targets selected to comprise patterns that are unique with respect to each other.

3. The system of claim 1, wherein each of the setup alignment targets are located within a die on the specimen, and wherein the reference location is a corner of the die.

4. The system of claim 1, wherein when two or more of the candidate alignment target images successfully aligned to their respective ones of the corresponding setup images, the computer subsystem is further configured for determining if the coordinates of the reference location separately determined for each of the two or more of the candidate alignment target images converge to within a predetermined distance of each other.

5. The system of claim 4, wherein the computer subsystem is further configured for determining the final coordinates with only the separately determined coordinates of the reference location determined to converge to within the predetermined distance of each other.

6. The system of claim 5, wherein the computer subsystem is further configured for determining the final coordinates with all of the separately determined coordinates of the reference location determined to converge to within the predetermined distance of each other.

7. The system of claim 4, wherein the separately aligning is performed with a first alignment method, and wherein when the coordinates of the reference location separately determined for said each of the two or more of the candidate alignment target images are determined to not converge to within the predetermined distance of each other, the computer subsystem is further configured for repeating the separately aligning with a second alignment method.

8. The system of claim 7, wherein when two or more of the candidate alignment target images successfully aligned to their respective ones of the corresponding setup images with the second alignment method, the computer subsystem is further configured for: separately determining additional coordinates of the reference location from coordinates for each of said two or more of the candidate alignment target images successfully aligned with the second alignment method and its corresponding one of the mutually linearly independent vectors; and determining if the separately determined additional coordinates of the reference location converge to within the predetermined distance of each other.

9. The system of claim 8, wherein when the separately determined additional coordinates of the reference location are determined to not converge to within the predetermined distance of each other, the computer subsystem is further configured for determining if there is a third alignment method; and when there is the third alignment method, the computer subsystem is further configured for repeating the separately aligning with the third alignment method.

10. The system of claim 8, wherein when the separately determined additional coordinates of the reference location are determined to not converge to within the predetermined distance of each other, the computer subsystem is further configured for determining if there is a third alignment method; and when there is not the third alignment method, the computer subsystem is further configured for aborting the separately aligning, separately determining the coordinates, and determining the final coordinates steps.

11. The system of claim 1, wherein when only one of the candidate alignment target images successfully aligned to its one of the corresponding setup images, the computer subsystem is further configured for determining the final coordinates of the reference location from the separately determined coordinates of the reference location determined for only the one of the candidate alignment target images.

12. The system of claim 1, wherein for at least one of the candidate alignment target images, the computer subsystem is further configured for performing said separately aligning the candidate alignment target images to the corresponding setup images with two or more alignment methods until the at least one of the candidate alignment target images successfully aligns to its one of the corresponding setup images.

13. The system of claim 1, wherein the computer subsystem is further configured for: performing said separately aligning for all of the candidate alignment target images with a first alignment method; and for any of the candidate alignment target images not successfully aligned to its one of the corresponding setup images with the first alignment method, performing said separately aligning with a second alignment method and said separately determining for each of one or more of the candidate alignment target images successfully aligned to its one of the corresponding setup images with the second alignment method.

14. The system of claim 13, wherein when at least a first of the candidate alignment target images successfully aligned to its one of the corresponding setup images with the first alignment method and at least a second of the candidate alignment target images successfully aligned to its one of the corresponding setup images with the second alignment method, the computer subsystem is further configured for: determining if the separately determined coordinates of the reference location determined for the at least the first and the at least the second of the candidate alignment target images converge to within a predetermined distance of each other; and performing said determining the final coordinates with only the separately determined coordinates of the reference location determined to converge to within the predetermined distance of each other.

15. The system of claim 14, wherein the computer subsystem is further configured for performing said determining the final coordinates with all of the separately determined coordinates of the reference location determined to converge to within the predetermined distance of each other.

16. The system of claim 1, wherein the computer subsystem is further configured for performing said separately aligning with a first alignment method, and wherein when none of the candidate alignment target images successfully align with its one of the corresponding setup images, the computer subsystem is further configured for performing said separately aligning with a second alignment method.

17. The system of claim 1, wherein said separately aligning is performed with a first alignment method, wherein when none of the candidate alignment target images successfully aligned with its one of the corresponding setup images, the computer subsystem is further configured for repeating said separately aligning with one or more additional alignment methods, and wherein when none of the candidate alignment target images successfully aligned with its one of the corresponding setup images with the one or more additional alignment methods, the computer subsystem is further configured for aborting the separately aligning, separately determining the coordinates, and determining the final coordinates steps.

18. The system of claim 1, wherein the imaging subsystem is further configured as an inspection subsystem.

19. A non-transitory computer-readable medium, storing program instructions executable on a computer system for performing a computer-implemented method for image alignment, wherein the computer-implemented method comprises:
   separately aligning candidate alignment target images in images generated for a specimen by an imaging subsystem to corresponding setup images for setup alignment targets selected to have mutually linearly independent vectors between locations of the setup alignment targets and a reference location;
   for each of one or more of the candidate alignment target images successfully aligned to its one of the corresponding setup images, separately determining coordinates of the reference location in the images generated for the specimen from coordinates for said each of the one or more of the candidate alignment target images and its corresponding one of the mutually linearly independent vectors; and
   determining final coordinates of the reference location in the images generated for the specimen from the separately determined coordinates of the reference location.

20. A computer-implemented method for image alignment, comprising:
   separately aligning candidate alignment target images in images generated for a specimen by an imaging subsystem to corresponding setup images for setup alignment targets selected to have mutually linearly independent vectors between locations of the setup alignment targets and a reference location;
   for each of one or more of the candidate alignment target images successfully aligned to its one of the corresponding setup images, separately determining coordinates of the reference location in the images generated for the specimen from coordinates for said each of the one or more of the candidate alignment target images and its corresponding one of the mutually linearly independent vectors; and
   determining final coordinates of the reference location in the images generated for the specimen from the separately determined coordinates of the reference location, wherein said separately aligning, said separately determining coordinates, and said separately determining final coordinates are performed by a computer subsystem.

* * * * *